(12) United States Patent
Harter et al.

(10) Patent No.: US 9,678,214 B2
(45) Date of Patent: Jun. 13, 2017

(54) DETERMINATION OF GPS COMPLIANCE MALFUNCTIONS

(71) Applicant: J. J. Keller & Associates, Inc., Neenah, WI (US)

(72) Inventors: Thomas C. Harter, Neenah, WI (US); Michael K. Kuphal, Greenville, WI (US); Bruce D. Lightner, La Jolla, CA (US)

(73) Assignee: J. J. Keller & Associates, Inc., Neenah, WI (US)

( * ) Notice: Subject to any disclaimer, the term of this patent is extended or adjusted under 35 U.S.C. 154(b) by 144 days.

(21) Appl. No.: 14/851,261

(22) Filed: Sep. 11, 2015

(65) Prior Publication Data

US 2017/0074987 A1    Mar. 16, 2017

(51) Int. Cl.
*G01C 21/10* (2006.01)
*G01S 19/23* (2010.01)

(52) U.S. Cl.
CPC .................... *G01S 19/23* (2013.01)

(58) Field of Classification Search
CPC ....................................................... G01S 19/23
See application file for complete search history.

(56) References Cited

U.S. PATENT DOCUMENTS

| | | | |
|---|---|---|---|
| 5,359,528 A | 10/1994 | Haendel et al. | |
| 5,694,322 A | 12/1997 | Westerlage et al. | |
| 5,928,291 A | 7/1999 | Jenkins et al. | |
| 5,970,481 A | 10/1999 | Westerlage et al. | |
| 6,253,129 B1 | 6/2001 | Jenkins et al. | |
| 6,571,168 B1 | 5/2003 | Murphy et al. | |
| 6,614,394 B2 | 9/2003 | Honda et al. | |
| 6,714,857 B2 | 3/2004 | Kapolka et al. | |
| 7,072,746 B1 | 7/2006 | Burch | |
| 7,117,075 B1 | 10/2006 | Larschan et al. | |
| 7,881,838 B2 | 2/2011 | Larschan et al. | |
| 7,996,150 B2 | 8/2011 | Nishida | |
| 8,018,329 B2 | 9/2011 | Morgan et al. | |
| 8,032,277 B2 | 10/2011 | Larschan et al. | |

(Continued)

OTHER PUBLICATIONS

Office Action from the US Patent and Trademark Office from U.S. Appl. No. 14/851,252 dated Sep. 28, 2016 (14 pages).

(Continued)

*Primary Examiner* — Ian Jen
(74) *Attorney, Agent, or Firm* — Michael Best & Friedrich LLP

(57) ABSTRACT

Systems and methods for the determination and recording of positioning system compliance malfunctions for commercial motor vehicles (CMV). One method includes detecting and accumulating the fault time when positioning system information is invalid or unavailable. Additionally, when positioning system information is invalid or unavailable, the processor estimates an uncertainty distance that the vehicle has travelled since the last valid location. The system then determines and records positioning system malfunction based on positioning system fault events, the accumulated fault time, and the uncertainty distance. The system stores valid location information and data relating to the positioning system fault event on the base unit until the base unit is coupled to the portable device.

22 Claims, 8 Drawing Sheets

(56) References Cited

U.S. PATENT DOCUMENTS

| | | | |
|---|---|---|---|
| 8,149,163 B2 | 4/2012 | Toda | |
| 8,284,069 B2 | 10/2012 | Sverrisson | |
| 8,442,508 B2 | 5/2013 | Harter et al. | |
| 8,620,515 B2 | 12/2013 | Kwak | |
| 8,626,568 B2 | 1/2014 | Warkentin et al. | |
| 8,805,418 B2 | 8/2014 | Nichols | |
| 8,909,248 B2 | 12/2014 | Phillips et al. | |
| 2002/0154035 A1* | 10/2002 | Flick | B60R 25/04 340/988 |
| 2002/0154036 A1* | 10/2002 | Flick | B60R 25/04 340/988 |
| 2002/0173887 A1* | 11/2002 | Flick | B60R 25/33 340/989 |
| 2003/0163249 A1 | 8/2003 | Kapolka et al. | |
| 2004/0243285 A1 | 12/2004 | Gounder | |
| 2005/0060070 A1 | 3/2005 | Kapolka et al. | |
| 2007/0050108 A1 | 3/2007 | Larschan et al. | |
| 2007/0067228 A1 | 3/2007 | Furman | |
| 2007/0129878 A1 | 6/2007 | Pepper | |
| 2007/0177605 A1 | 8/2007 | Benco et al. | |
| 2009/0006107 A1 | 1/2009 | Golden | |
| 2010/0061190 A1 | 3/2010 | Nelson | |
| 2011/0218896 A1 | 9/2011 | Tonnon et al. | |
| 2012/0303256 A1 | 11/2012 | Morgan et al. | |
| 2013/0006519 A1 | 1/2013 | Doherty et al. | |
| 2013/0024084 A1* | 1/2013 | Yamashiro | B60W 50/029 701/96 |
| 2013/0031029 A1 | 1/2013 | Davidson | |
| 2013/0054135 A1 | 2/2013 | Backsen, Jr. | |
| 2013/0226397 A1 | 8/2013 | Kuphal et al. | |
| 2013/0302758 A1 | 11/2013 | Wright | |
| 2013/0342343 A1* | 12/2013 | Harring | G08B 21/18 340/521 |
| 2015/0100199 A1* | 4/2015 | Kurnik | G07C 5/0808 701/32.4 |
| 2015/0112542 A1 | 4/2015 | Fuglewicz | |
| 2016/0261622 A1* | 9/2016 | Danielson | H04L 67/1095 |
| 2017/0001653 A1* | 1/2017 | Ferencz, Jr. | B61L 3/127 |

OTHER PUBLICATIONS

Federal ELD Regulations, published in the Federal Register, vol. 79, No. 60, Mar. 28, pp. 17655-17724 (2014).

Comments by Eclipse Software Systems to Proposed Federal ELD Regulations, published at http://www.regulations.gov under docket No. FMCSA-2010-0167 at least as early as Jul. 29, 2015.

Comments by Inthinc Technology Solutions to Proposed Federal ELD Regulations, published at http://www.regulations.gov under docket No. FMCSA-2010-0167, Jun. 25, 2014.

Comments by Omnitracs, LLC to Proposed Federal ELD Regulations, published at http://www.regulations.gov under docket No. FMCSA-2010-0167 at least as early as Jul. 29, 2015.

Comments by Zonar Connected to Proposed Federal ELD Regulations, published at http://www.regulations.gov under docket No. FMCSA-2010-0167 at least as early as Jul. 29, 2016.

Comments by XRS Corporation to Proposed Federal ELD Regulations, published at http://www.regulations.gov under docket No. FMCSA-2010-0167 at least as early as Jul. 29, 2017.

Comments by Saucon Technologies to Proposed Federal ELD Regulations, published at http://www.regulations.gov under docket No. FMCSA-2010-0167, Jun. 12, 2014.

* cited by examiner

DETERMINATION OF GPS COMPLIANCE MALFUNCTIONS

BACKGROUND

Embodiments of the invention relate to systems and methods for the determination and recording of positioning system compliance malfunctions for commercial motor vehicles.

Operators of commercial motor vehicles ("CMV's") are required to meet certain specific performance standards and regulations for operating such vehicles. For example, some operators of the CMV's are required to meet hours-of-service regulations.

The current U.S. Department of Transportation proposal requires the monitoring of availability of valid position measurements for Electronic Logging Devices (ELD). It is currently required that an ELD monitor elapsed time during periods when the ELD fails to acquire a valid position measurement within the past 5 miles of a CMV's movement. If the amount of time exceeds 60 minutes in 24 hours, then there is a positioning system malfunction.

SUMMARY

One embodiment of the invention provides a method of determining a positioning system malfunction for a Commercial Motor Vehicle (CMV). The method includes detecting a positioning system fault event using a base unit and determining an accumulated fault time using a portable device. The method also includes storing valid location information indicative of a last valid location of the CMV as determined by the positioning system and storing data relating to the positioning system fault event on the base unit until the base unit is coupled to the portable device. Additionally the method includes estimating, using a processor, an uncertainty distance which is a measured distance since the last valid location—as indicated by the valid location information. The method also includes determining a positioning system malfunction based on the positioning system fault event, the accumulated fault time and the uncertainty distance, and recording the positioning system malfunction.

Another embodiment of the invention provides a system configured to determine a positioning system malfunction for a CMV. The system includes a base unit installed in the vehicle, at least one processor, a portable device, and at least one physical computer storage medium. The at least one physical computer storage medium includes stored executable instructions that when executed by the at least one processor cause the at least one processor to perform operations. Those operations include detecting a positioning system fault event using the base unit and determining an accumulated fault time using a portable device. The operations also include storing valid location information indicative of a last valid location of the CMV as determined by the positioning system and storing data relating to the positioning system fault event on the base unit until the base unit is coupled to the portable device. Additionally, the operations include estimating, using a processor, an uncertainty distance which is a distance since the last valid location as indicated by the valid location information. The operations also include determining a positioning system malfunction based on the positioning system fault event, the accumulated fault time and the uncertainty distance, and recording the positioning system malfunction.

In another aspect, the invention includes at least one physical computer storage medium including stored instructions. The stored instructions, when executed, determine a positioning system malfunction for a CMV. The at least one physical storage medium includes instructions which, when executed by a processor perform operations. Those operations include detecting a positioning system fault event using a base unit and determining an accumulated fault time using a portable device. The operations also include storing valid location information indicative of a last valid location of the CMV as determined by the positioning system and storing data relating to the positioning system fault event on the base unit until the base unit is coupled to the portable device. Additionally, the operations include estimating, using a processor, an uncertainty distance which is a distance since the last valid location as indicated by the valid location information. The operations also include determining a positioning system malfunction based on the positioning system fault event, the accumulated fault time, and the uncertainty distance, and recording the positioning system malfunction.

In each of the embodiments, distributed processing divides certain tasks between a base unit and a portable device. The base unit stores valid location information indicative of a last valid location of the CMV as determined by the positioning system. The base unit generates events based on the positioning system uncertainty distance, vehicle motion, and time period boundaries. The portable device determines accumulated fault time and stores compliance malfunctions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being carried out in various ways.

In one particular embodiment, the invention provides a system for logging performance of a driver operating a vehicle having a vehicle information system from which at least one vehicle operating parameter may be obtained in a performance monitoring process. The vehicle operating parameters collected through the vehicle information system and information such as operator identity from a portable device are wirelessly communicated to a remote host through a network such as the Internet.

Figure 1:
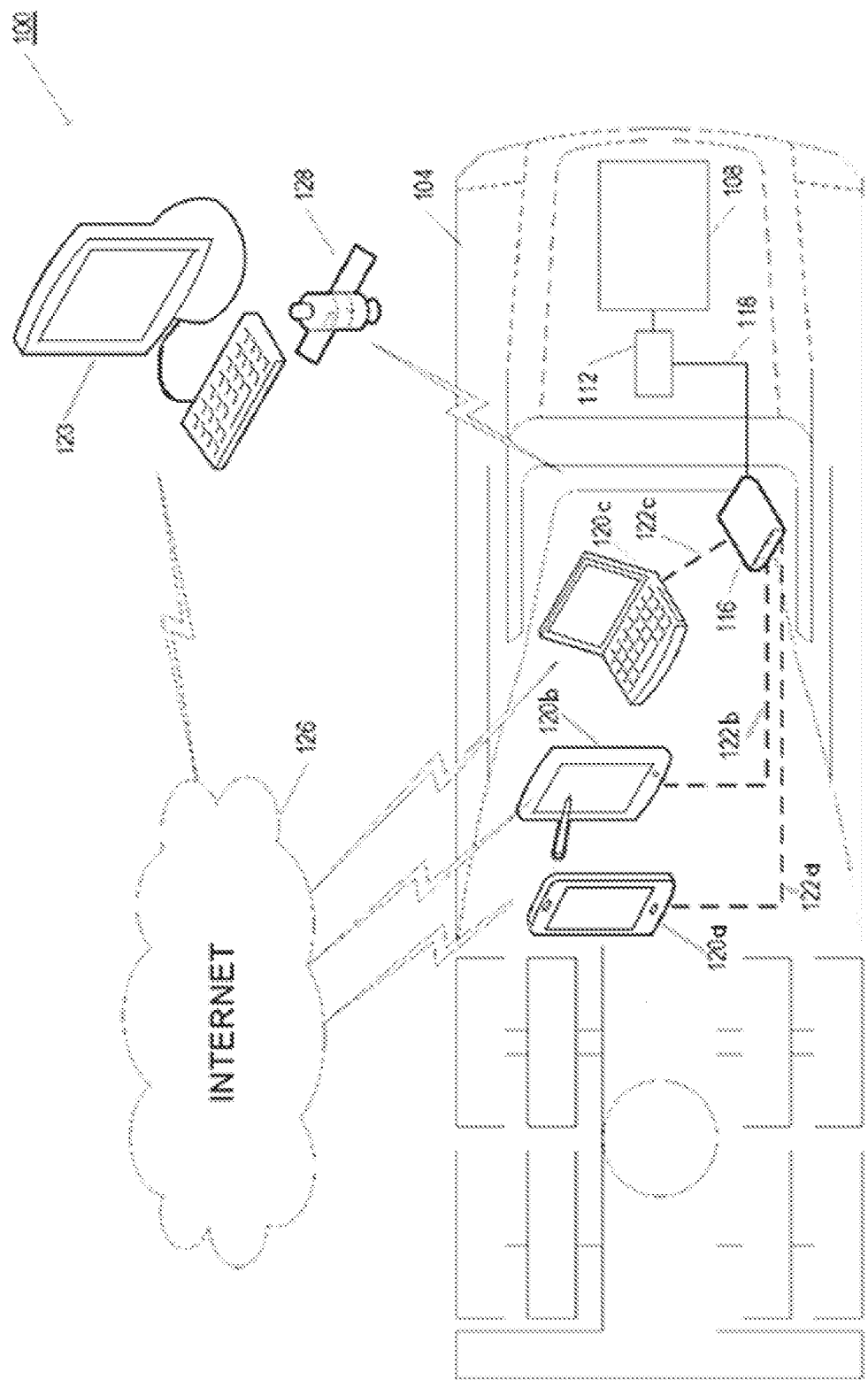
FIG. 1 is a schematic of a system in accordance with an embodiment of the invention.

FIG. 1 shows a performance monitoring system 100 for use with a commercial motor vehicle ("CMV") 104. Although the CMV 104 illustrated is a tractor configured to tow a trailer (not shown), the performance monitoring system 100 can also be implemented in other types of CMV's such as construction vehicles and agricultural equipment. The CMV 104 includes an engine 108 that drives the CMV 104, and is controlled by an electronic control unit ("ECU") 112 that determines operating information or parameters from the engine 108, and other parts of the CMV 104. Operating parameters monitored by the ECU 112 include speed, hours of service, operating status, ignition switch status, trip distance, total vehicle distance, and the like.

The performance monitoring system 100 also includes an electronic on-board recorder ("EOBR") base unit 116 that communicates with the ECU 112 through an information bus 118 conforming to standards such as SAE J1939 and SAE J1708 network buses. The base unit 116 has a plurality of functions including, but not limited to, time keeping and data logging. In one implementation, the base unit 116 records and stores CMV information or data from the ECU 112 that is necessary to comply with U.S. Department of Transportation regulations such as those mentioned above. The performance monitoring system 100 also includes a portable device such as a mobile phone 120a, a tablet 120b, a laptop computer 120c, or the like, that communicates with the base unit 116. The portable device may be an Android, Apple iOS, Microsoft Windows or similar based device. In one embodiment, the portable device includes an application for logging purposes. The application processes and stores data from the base unit 116 retrieved from the information bus 118. The application allows for manual entries made by the driver. The application also generates Hours of Service (HOS) compliance data, vehicle performance data, and driver performance data. This data includes driving time and driving distance. The base unit 116 communicates with the portable device through a cable or wireless link 122a, 122b, 122c. The link 122a, 122b, 122c may be a serial cable, such as a USB cable. Other exemplary links include a wireless personal-area-network such as Bluetooth, Wi-Fi, Near Field Communication, and the like. The portable device generally supports multiple platforms such as smart phones 120a, tablets 120b, and computers such as laptops 120c.

The performance monitoring system 100 includes a remote server 123 running a remote application that wirelessly communicates with the portable device via a network such as the Internet, detailed hereinafter. An application on the portable device may send data to the remote server 123 for viewing, reporting, and analyzing. A global position satellite ("GPS") system or other positioning system 128 also communicates with the ECU 112 and/or the base unit 116 so that information from the positioning system 128 (such as time and location) is available to the CMV 104. In some embodiments, at least a portion of the information stored in the base unit 116 or information communicated to and from the base unit 116 is encrypted.

Processing is distributed or shared between the base unit 116 and the portable device. The base unit stores valid location information indicative of a last valid location of the CMV as determined by the positioning system. The base unit generates events based on a positioning system 128 uncertainty distance, vehicle motion, and time period boundary crossing. The portable device determines accumulated fault time and stores compliance malfunctions.

Figure 2:
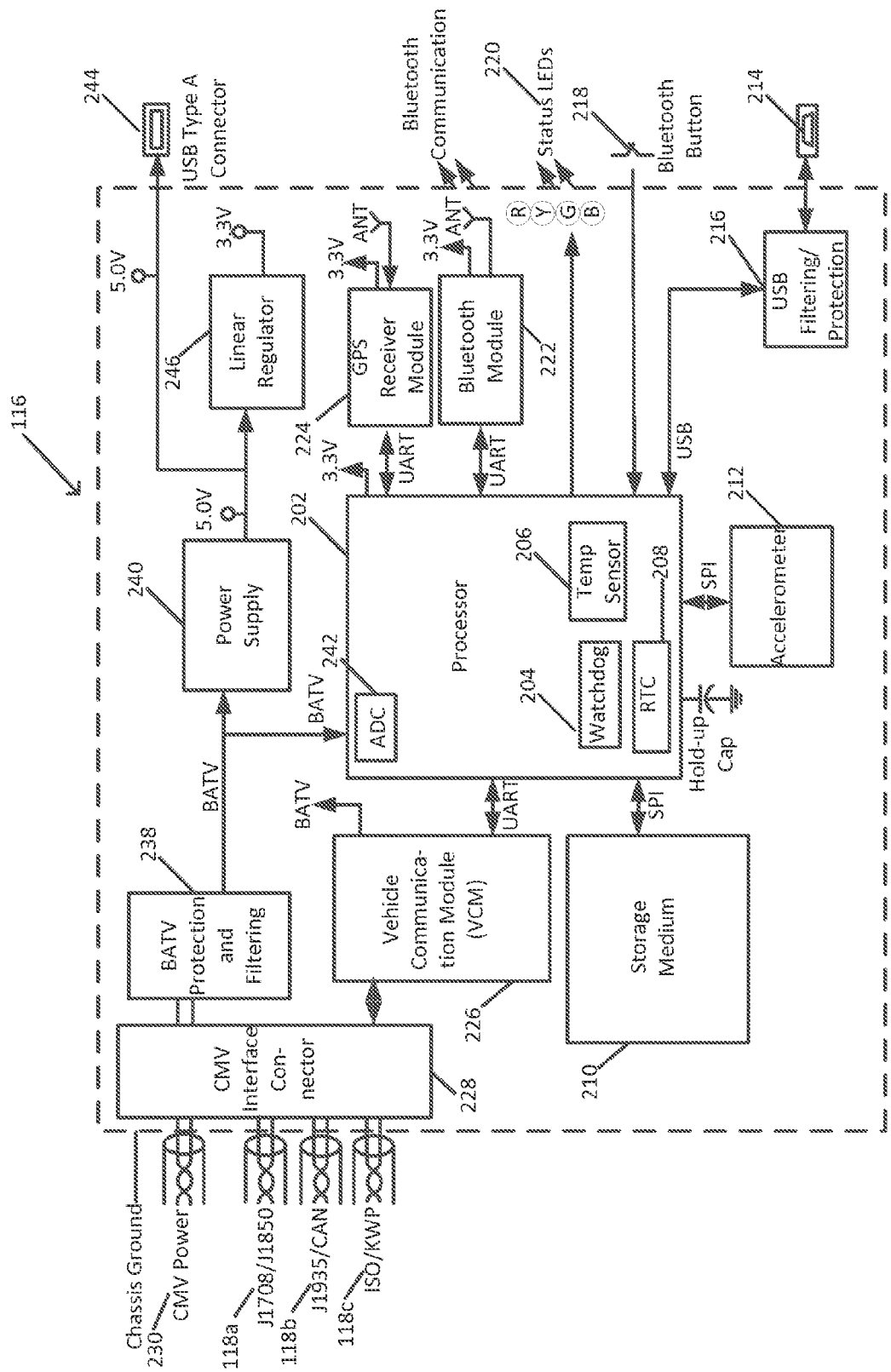
FIG. 2 illustrates a base unit of the system in FIG. 1 in a block diagram format.

FIG. 2 shows the base unit 116 in a block diagram format. The base unit is a low-power, custom designed telematics device that incorporates a processor 202. In another embodiment, the base unit 116 is a telematics device which gathers vehicle data from the on-board diagnostic (OBD) connecter and includes a GPS receiver.

As shown, the base unit 116 includes a processor (such as a microprocessor, controller or application-specific-integrated-circuit ("ASIC")) 202. The processor 202 preferably includes a custom programmed STM32ARM Cortex M3 microcontroller with 768 Kbytes of program flash memory and 96 Kbytes of static RAM memory, running a free license Real Time Operating System such as FreeRTOS. The processor includes a watchdog 204, temperature sensor 206, and real-time clock (RTC) 208, which provides a real-time clock function to allow software to accurately determine a time with a predetermined resolution. In some embodiments, the RTC 208 is required to remain operational while the CMV 104 (FIG. 1) does not provide power to the base unit 116.

The processor 202 is coupled to a storage medium 210. The storage medium 210 is physical, non-transient storage device. The storage medium 210 is preferably a non-volatile 32 megabyte flash memory device 32, but could also be any type of non-volatile flash memory including a NAND or NOR interface or a serial or parallel interface. In addition, the storage medium 210 may be a combination of RAM, ROM, EEPROM, CD-ROM, magnetic disk storage, other magnetic storage devices, or any other medium that could be used to store computer executable instructions or data structures.

The processor 202 is coupled to an accelerometer 212. The base unit 116 also includes a USB micro AB connector 214 to transmit and receive data through a USB connector of an external portable device. The received data is filtered and protected with a USB protection and filtering module 216 before going to the processor 202. The processor 202 is coupled to a Bluetooth button 218. Additionally, the processor 202 displays the status of the base unit 116 with a plurality of status light-emitting-diodes 220 that are red (R), yellow (Y), blue (B), and green (G).

To communicate with the portable device, the base unit 116 includes a Bluetooth Module 222 configured to be connected to the processor. To receive a GPS signal from the GPS system 128 (FIG. 1), the base unit 116 includes a GPS receiver module configured to be connected to the processor.

The processor 202 is coupled to a vehicle communication module (VCM) 226. The VCM 226 preferably has 64 Kbytes of programmed flash memory and 20 KB of static RAM memory. This VCM 226 is coupled to a CMV 228 interface connector that connects to the CMV power bus 230. Bus 230 provides communication between the ECU 112 (FIG. 1) and the SAE J1708/SAE J1850 network bus 118a, the SAE J1939/CAN network bus 118b, and the ISO/KWP bus 118b. KWP is a Keyword Protocol promulgated by the International Organization for Standardization.

In the embodiment shown, the base unit 116 receives its power from the CMV 104 through the CMV interface connector 228 and a CMV power bus 230. The power is regulated and surge-protected with a Battery Voltage (BATV) protection and filtering system 238, and a power supply circuit 240 that is preferably a 5.0 V switch mode power supply. This power supply and voltage protection and filtering system 238 are coupled to the processor 202, where the signals are converted with the Analog-to-Digital Converter (ADC) 242. The power supply 240 is also connected to USB type A connector 244 and a linear regulator 246. Preferably, the linear regulator is a 3.3V low-dropout (LDO) linear regulator.

Figure 3:
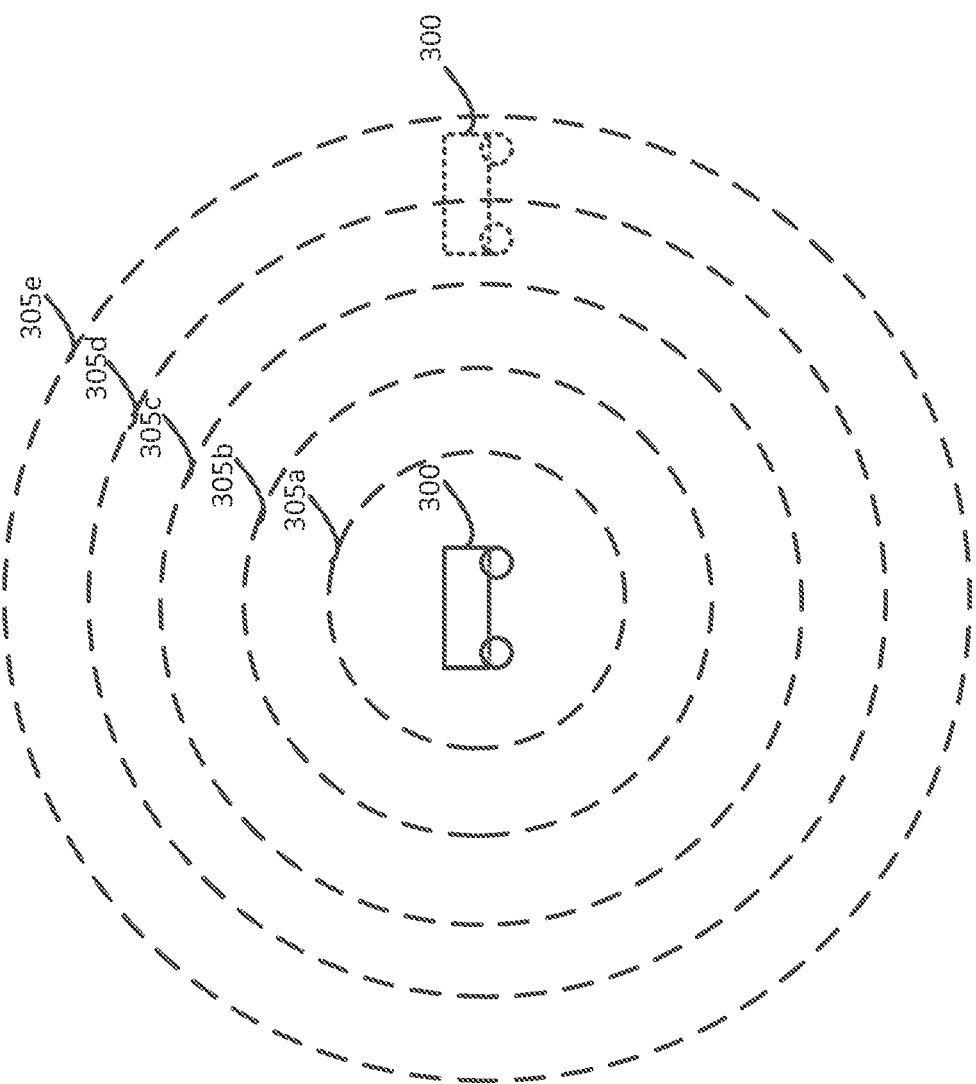
FIG. 3 shows the uncertainty distance in relation to the last valid positioning system location.

FIG. 3 shows the uncertainty distance in relation to the last valid positioning system location. A positioning system record is generated for a specified interval of time, preferably at 15 second intervals. If there is no valid positioning system location information at these intervals of time, then an uncertainty distance 305a-305e is estimated for where the vehicle 300 could be located in relation to the last valid positioning system location. The uncertainty distance is estimated, using a processor 202 (FIG. 2), by multiplying the fault time, or the elapsed time when there is no valid positioning system location information, by each corresponding driving speed, as determined by the odometer, at which the driver was driving the CMV while traversing the corresponding portion of the uncertainty distance to yield at least one product and adding the products.

The system assumes the vehicle 300 is located where the last valid positioning system location was received. If there is no valid positioning system location information at a specified interval of time to generate a positioning system record, then an uncertainty distance is estimated. This uncertainty distance is found based on the speed of the vehicle 300 and time elapsed using available data, such as odometer data, when valid positioning system location information is unavailable from the positioning system. This uncertainty distance creates a radius in which the vehicle 300 is probably located. If there is no valid positioning system location information at the first specified interval of time to generate a positioning system record, then the vehicle is probably located at any location within circle 305a, determined by the uncertainty distance. If the vehicle 300 continues to travel, then the uncertainty distance increases and the vehicle 300 is probably located at any location within the circle 305b during the next estimated position record. As the vehicle continues to travel, and the uncertainty distance increases since the last estimated position record, the vehicle 300 is probably located at any location within the circle 305c. When the next estimated position record is obtained, the vehicle is probably located within the circle 305d, and the vehicle is probably located within the circle 305e when the next estimated position record is obtained. This uncertainty distance value is used to estimate vehicle location until valid positioning system location information is received.

It is important to estimate the uncertainty distance because positioning system fault events are based off of the distance traveled by a vehicle when there is no valid positioning system location information. If the vehicle travels more than a predetermined distance, preferably 5 miles, then the amount of time that the system does not receive valid positioning system location information must be recorded and the accumulated fault time over a designated time period, preferably 24 hours, determines whether there has been a positioning system malfunction.

Figure 4:
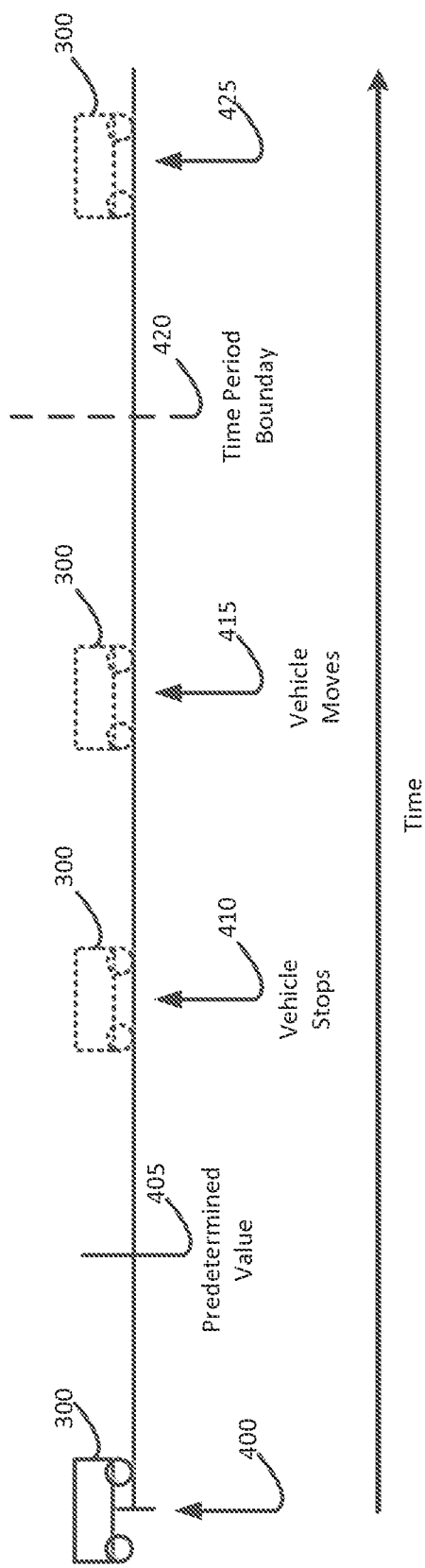
FIG. 4 shows state machine events in accordance with the vehicle motion and positioning system location information availability.

FIG. 4 shows state machine events in accordance with the vehicle motion and positioning system location information availability. The location where the last valid positioning system location information was received is represented by the vehicle 300 at position 400 and corresponds to the centrally-positioned vehicle 300 in FIG. 3. As the vehicle 300 travels without valid positioning system location information, the uncertainty distance is monitored until it reaches a predetermined value 405, preferably 5 miles. The processor 202 (FIG. 2) on the base unit 116 (FIG. 1) stores the positioning system information and estimates, in real-time, the uncertainty distance when valid positioning system location information is unavailable. When the predetermined value is reached, then a GPS event is created with the GPS fault set to ON. Fault time needs to be tracked for compliance whenever the positioning system location information is invalid for a driving distance that is greater than the predetermined value, preferably 5 miles. If the vehicle stops at location 410, then a stop event is set to ON and a GPS event is created. The processor 202 (FIG. 2) does not track time when the vehicle 300 is stopped when valid location information is not available. The fault time only needs to be measured when the vehicle 300 is moving to determine a malfunction. If the vehicle 300 stops, when it moves again at location 415, then a move event is set or recorded, and a GPS event is created. The processor 202 (FIG. 2) begins to track fault time again.

If the vehicle 300 travels for a time that reaches the time period boundary 420, preferably 24 hours, then a GPS event is created. The total fault time is accumulated by the portable device for each time period boundary, preferably 24 hours in order to determine a compliance malfunction. Positioning system fault events are accumulated for each time period boundary. If the accumulated fault time exceeds a predetermined value, preferably 60 minutes, then there is a positioning system compliance malfunction. After the time period boundary is reached, the processor 202 (FIG. 2) continues to monitor the positioning system location information. If valid positioning system location information is received such as at position 425, then the processor 202 (FIG. 2) creates a GPS event with the GPS fault being set to OFF. The processor 202 (FIG. 2) continues to track the vehicle 300 and monitor the positioning system location information.

Figure 5:
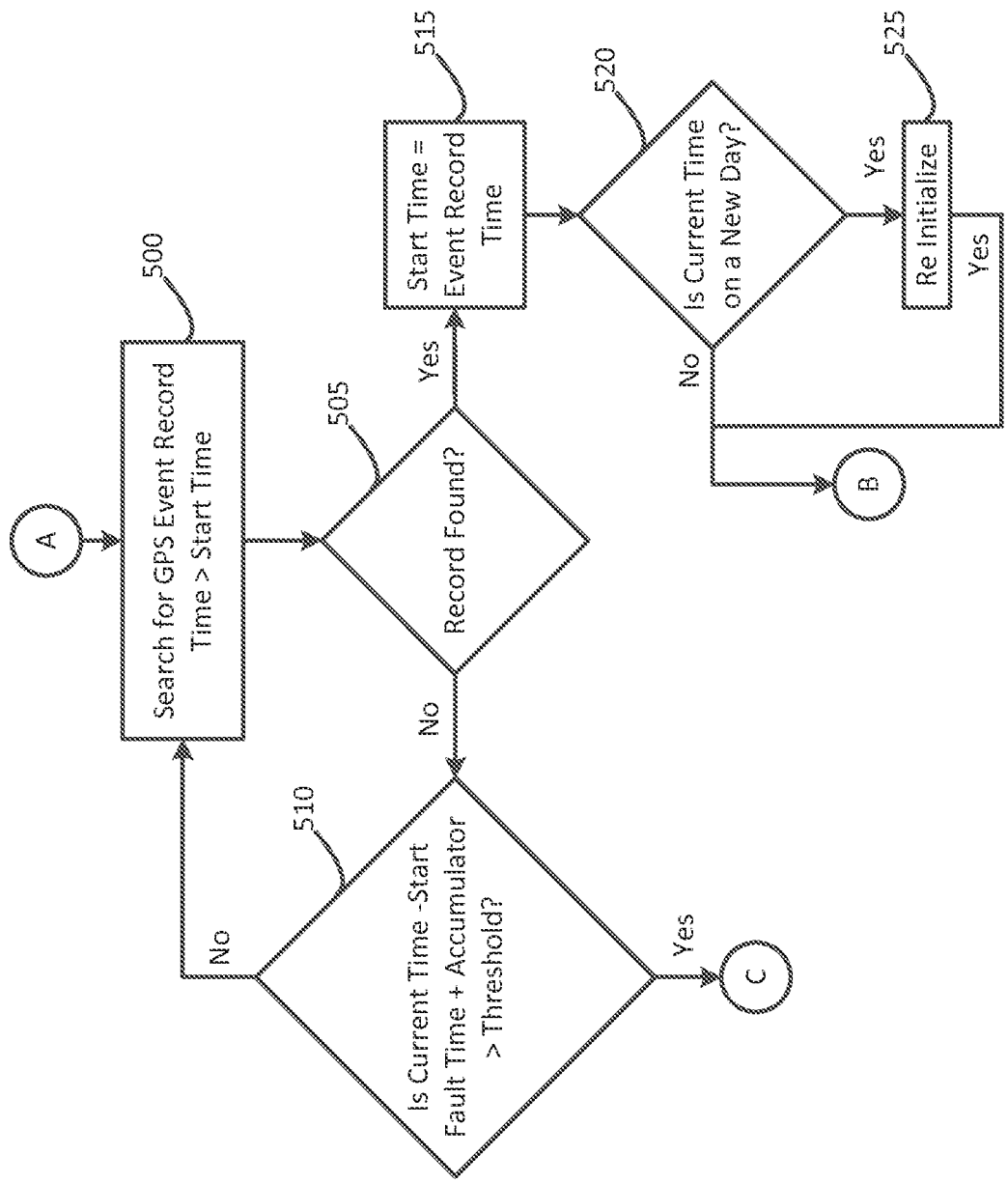
FIG. 5 is a flow diagram used to begin determining whether there is a compliance malfunction for the positioning system.

FIG. 5 is a flow diagram used to determine whether there is a compliance malfunction for the positioning system 128 (FIG. 1). Processing is partitioned or distributed between the portable device and the base unit 116 (FIG. 1). This flow diagram is implemented when there is a start of a new day as defined by the daily start time from the driver settings. This START time occurs when a time period boundary is crossed. When a driver starts working, the process begins at step 500 by searching for a GPS event record that is greater than the start time, wherein the start time begins at the time period boundary. A GPS event record is recorded when no valid location information is available above a threshold, preferably 5 miles. At step, 505, the processor 202 (FIG. 2) determines if a record is found. If no record is found, the positioning system 128 (FIG. 1) is sending valid location information. At step 510, the processor determines if the difference between the current time, or time since the last start fault time, and the start fault time added to the accumulator is greater than a predetermined threshold, preferably 60 minutes. The difference between the current time and the start fault time is the elapsed time for the current positioning system fault event when the system is not receiving valid positioning system location information. The accumulator is an accumulated fault time for the total elapsed time of each fault event in the time period boundary, preferably 24 hours. The accumulated fault time is determined by the portable device. If there is an interruption in the connection between the base unit 116 (FIG. 1) and the portable device, then the base unit stores the positioning system location information until the portable device can receive it and determine the accumulated fault time. If the value is greater than the threshold, there is a compliance malfunction and the process continues to step 620 of FIG. 6. A warning may be generated if there is a compliance malfunction. This warning can be a visual, audio, or another type of notification on a mobile device 120a, tablet 120b, laptop computer 120c, or similar apparatus. If the value is less than the threshold, then the process loops back to step 500, where the process continues to determine if a there is a GPS event record time that is greater than the start time. If there is no GPS event record, then the process will always loop back to step 500 because the start fault time and the accumulator both have a value of zero. Therefore, the threshold will not be exceeded.

If a record is found, valid positioning location information is not being received by the processor 202 (FIG. 2) for a predetermined threshold, preferably 5 miles, and the process continues to step 515 where the start time is set equal to the event record time. Then at step 520, the processer 202 (FIG. 2) determines if the current time is during a new day, meaning a time period boundary has been crossed, which is, preferably 24 hours. If the current time occurs during a new day, then the processor re-initializes because a compliance malfunction is determined by the amount of time that valid position information is not received over a time period, preferably a 24 hour period. Re-initializing clears the previous malfunctions and resets the accumulator to zero. The process then continues to step 600 of FIG. 6. If the current time is not during a new day in step 520, then the process continues to step 600 of FIG. 6.

Figure 6:
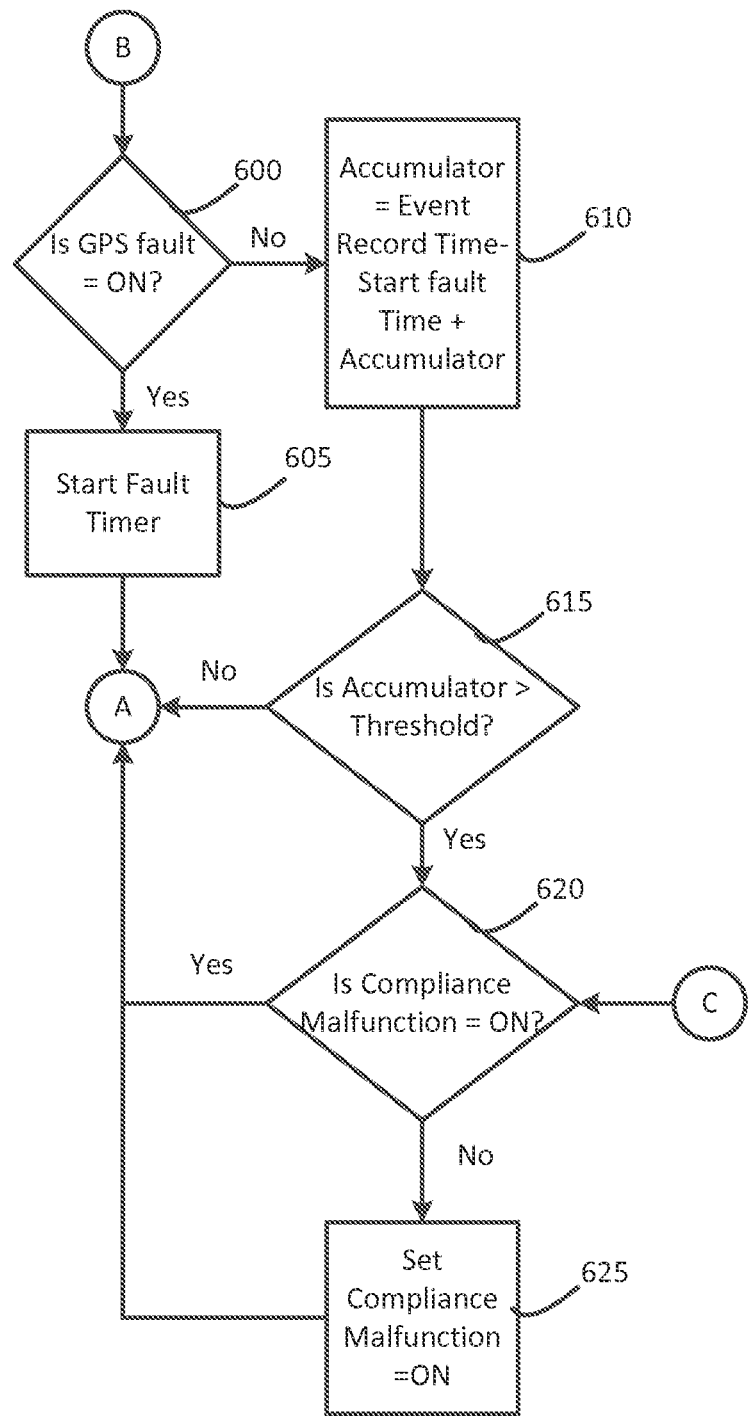
FIG. 6 is a continuation of the flow diagram used to determine whether there is a compliance malfunction for the positioning system.

FIG. 6 is a continuation of the flow diagram to determine whether there is a compliance malfunction for the positioning system 128 (FIG. 1). At step 600, the processor 202 (FIG. 2) determines if the GPS fault is set to ON. If the GPS fault is set to ON, then the fault timer begins at step 605, and the process continues to step 500 of FIG. 5. If the GPS fault is not set to ON, then the accumulator is set equal to the event record time minus the start fault time plus the current accumulator value at step 610. At this step, the portable device determines the accumulated fault time, or the total elapsed time with no valid position information. This accumulated fault time is compared to a threshold value at step 615. The threshold value is a predetermined value for a compliance malfunction. If accumulated fault time exceeds the value, which is preferably 60 minutes, then there is a compliance malfunction and the process moves to step 620, where the processor determines if the compliance malfunction is set to ON. If the compliance malfunction is set to ON then the process continues to step 500 of FIG. 5. If the compliance malfunction is not set to ON, then the compliance malfunction is set to ON and the process continues to step 500 of FIG. 5.

Figure 7:
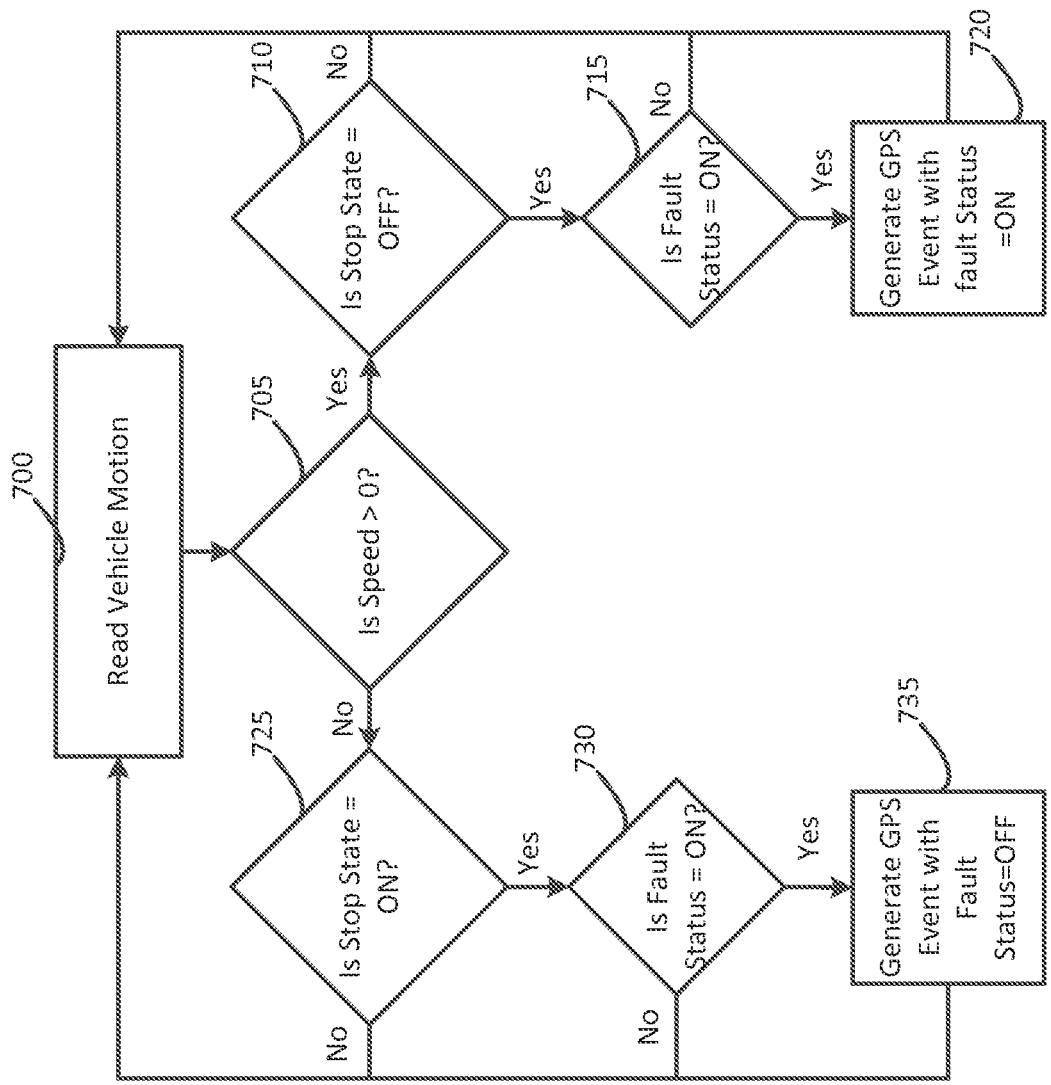
FIG. 7 is a flow diagram for the vehicle motion.

FIG. 7 is a flow diagram to determine vehicle motion. It is important to know vehicle motion because time does not need to be monitored when there is no valid positioning system location information if the vehicle 300 (FIG. 3) is not moving. The process begins with step 700 which reads the vehicle motion. Vehicle motion is read using an odometer or other measuring apparatus for vehicle operating parameters. The system is initialized with the stop state set to ON. At step 705, the processor 202 (FIG. 2) determines if the vehicle speed is greater than zero. If the speed is greater than zero, then the processor 202 (FIG. 2) determines if the stop state is set to OFF at step 710. The stop state is determined by the positioning system records. If the stop state is not set to OFF, then the processor 202 (FIG. 2) continues to read vehicle motion at step 700. If the stop state is set to OFF, the processor 202 (FIG. 2) checks if the fault status is ON at step 715. If the fault status is not ON, then the system continues to read vehicle motion at step 700 since there is no problem with the location information from the positioning system 128 (FIG. 1). If the fault status is ON, then the processor generates a GPS event where the fault status is ON at step 720. The process loops back to reading the vehicle motion at step 700.

If the vehicle 300 (FIG. 3) is not moving as determined in step 705, the processor 202 (FIG. 2) determines if the stop state is ON in step 725. If the stop state is not set to ON, then the system continues to read the vehicle motion at step 700. If the stop state is set to ON, then the processor 202 (FIG. 2) determines if the fault status is set to ON at step 730. If the fault status is not set to ON, then the system continues to read vehicle motion at step 700. If the fault status is set to ON, then a GPS event is generated with the fault status set to OFF at step 735. The status is set to OFF because the vehicle 300 (FIG. 3) is not moving. Compliance malfunctions are based off of the distance traveled by the vehicle, so if the vehicle 300 (FIG. 3) is not moving, then the fault does not need to be tracked. Once the status is set to OFF, then the process loops back to step 700 where the processor reads vehicle motion.

Figure 8:
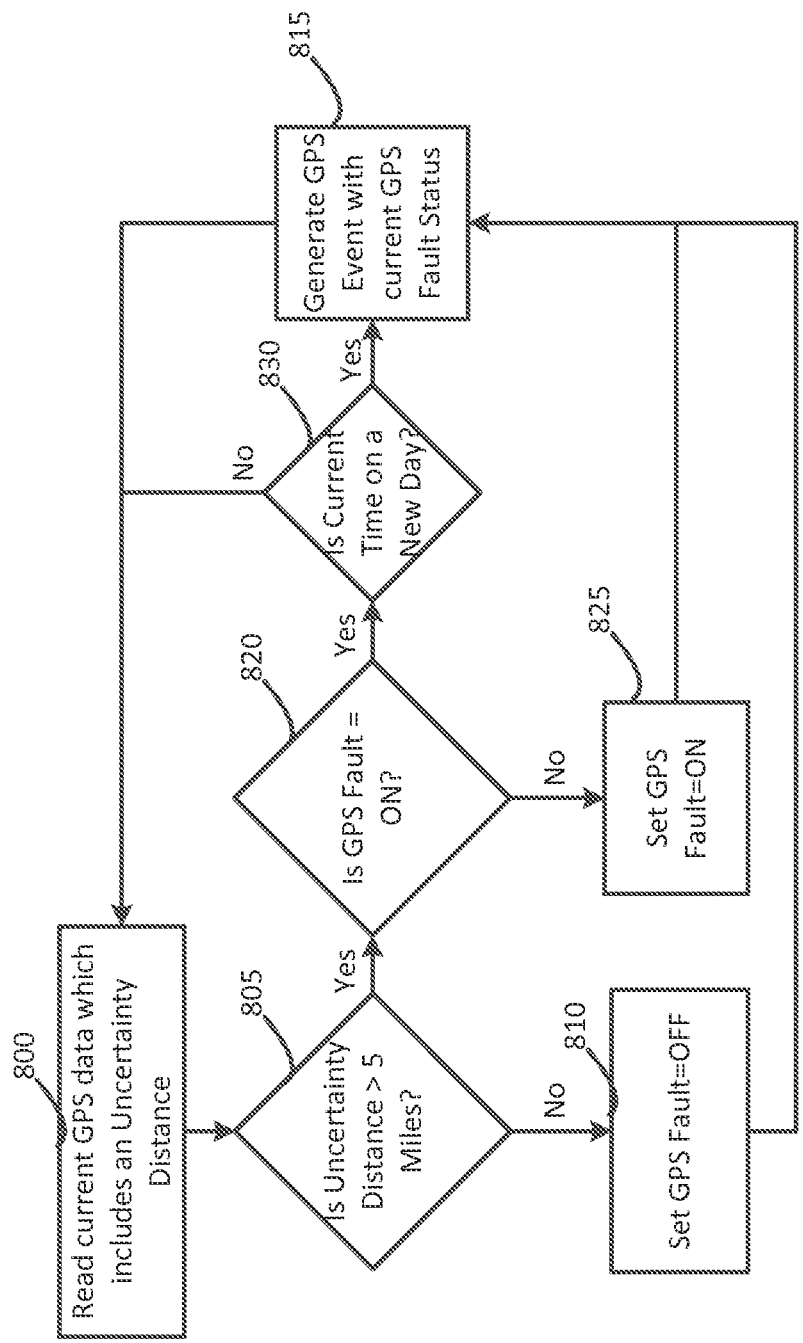
FIG. 8 is a flow diagram for the GPS fault status.

FIG. 8 is a flow diagram for GPS fault status tracking The process begins at step 800, where the processor reads the current positioning system location information which includes an uncertainty distance. At step 805, the processor 202 (FIG. 2) determines if the uncertainty distance is greater than a predetermined distance, preferably 5 miles. This predetermined distance is the regulation distance for which a GPS fault is required to be monitored. The GPS fault time needs to be tracked when the uncertainty distance reaches or exceeds the predetermined distance. If the uncertainty distance is less than the predetermined distance, than the GPS fault status is set to OFF at step 810. Then at step 815, a GPS event is generated with the current GPS fault status, which in this case is OFF. The process loops back to step 800 where current positioning system location information is read which includes an uncertainty distance.

If the uncertainty distance is greater than 5 miles, as determined at step 800, then the processor 202 (FIG. 2) determines if the positioning system fault is set to ON at step 820. If the GPS fault is not set to ON, then the GPS fault is set to ON at step 825 and the processor 202 (FIG. 2) generates a GPS event with the current GPS fault status at step 815, in this case the fault status is on.

If the GPS fault is set to ON as determined in step 820, then the processor determines if the current time is set to a new day at step 830 or if it has crossed the time period boundary, preferably 24 hours. This step is necessary because malfunctions are based on 24 hour time periods. If the current time is not on a new day, then the processor loops to step 800 where the processor continues to read current positioning system location information while the GPS fault status is set to ON. If the current time is on a new day as determined in step 830, then a GPS event is generated with the current GPS fault state at step 830, which in this case is on. A new event is generated because a GPS fault started for a new 24 hour period where all of the faults need to be tracked for that period. After the GPS event is generated, the process loops back to step 800 where the processor reads the current GPS data.

What is claimed is:

1. A method of determining a positioning system malfunction for a commercial motor vehicle (CMV), the method comprising:
   detecting a positioning system fault event using a base unit;
   determining an accumulated fault time using a portable device;

storing valid location information indicative of a last valid location of the CMV as determined by the positioning system;

storing data relating to the positioning system fault event on the base unit until the base unit is coupled to the portable device;

estimating, using a processor, an uncertainty distance which is a distance since the last valid location as indicated by the valid location information;

determining a positioning system malfunction based on the positioning system fault event, the accumulated fault time, and the uncertainty distance; and recording the positioning system malfunction.

2. The method of claim 1, wherein detecting a positioning system fault event includes generating a warning.

3. The method of claim 2, wherein the generating a warning includes generating the warning on the portable device.

4. The method of claim 1, wherein estimating, using a processor, the uncertainty distance includes measuring a driving speed and the fault time.

5. The method of claim 4, wherein the estimating step includes:
multiplying each elapsed fault time by a corresponding driving speed to yield at least one product; and
summing the at least one product to obtain the uncertainty distance.

6. The method of claim 4, wherein the uncertainty distance is estimated until there is valid positioning system location information.

7. The method of claim 1, wherein recording the malfunction includes storing malfunction data on the portable device.

8. A system configured to determine a positioning system malfunction for a commercial motor vehicle (CMV), the system comprising:
a base unit installed on the vehicle;
at least one processor;
a portable device;
at least one physical computer storage medium comprising stored executable instructions that when executed by the at least one processor cause the at least one processor to perform the following operations:
detecting a positioning system fault event using the base unit;
determining an accumulated fault time using the portable device;
storing valid location information indicative of a last valid location of the CMV as determined by the positioning system;
storing data relating to the positioning system fault event on the base unit until the base unit is coupled to the portable device;
estimating, using a processor, an uncertainty distance which is a distance since the last valid location as indicated by the valid location information;
determining a positioning system malfunction based on the positioning system fault event, the accumulated fault time, and the uncertainty distance; and
recording the positioning system malfunction.

9. The system of claim 8, wherein the at least one physical computer storage medium includes instructions that, when executed by the at least one processor, generate a warning.

10. The system of claim 9 wherein the at least one physical computer storage medium includes instructions that, when executed by the at least one processor, generate the warning on the portable device.

11. The system of claim 8, wherein the at least one physical computer storage medium includes instructions that, when executed by the at least one processor, estimate the uncertainty distance, including measuring a driving speed and the fault time.

12. The system of claim 11, wherein the at least one physical computer storage medium includes instructions that, when executed by the at least one processor, estimate the uncertainty distance including:
multiplying each elapsed fault time by a corresponding driving speed to yield at least one product; and
summing the at least one product to obtain the uncertainty distance.

13. The system of Clam 11, wherein the at least one physical computer storage medium includes instructions that, when executed by the at least one processor, estimate the uncertainty distance until there is valid positioning system location information.

14. The system of claim 8, wherein the at least one physical computer storage medium includes instructions that, when executed by the at least one processor, store malfunction data on the portable device.

15. At least one physical computer storage medium comprising stored instructions which when executed determine a positioning system malfunction for a commercial motor vehicle (CMV), the at least one physical storage medium comprising instructions which, when executed by a processor, perform the following operations:
detecting a positioning system fault event using a base unit;
determining an accumulated fault time using a portable device;
storing valid location information indicative of a last valid location of the CMV as determined by the positioning system;
storing data relating to the positioning system fault event on the base unit until the base unit is coupled to the portable device;
estimating, using a processor, an uncertainty distance which is a distance since the last valid location as indicated by the valid location information;
determining a positioning system malfunction based on the positioning system fault event, the accumulated fault time, and the uncertainty distance; and
recording the positioning system malfunction.

16. The storage medium of claim 15, wherein the at least one physical computer storage medium includes instructions that, when executed by a processor, generate a warning.

17. The storage medium of claim 16, wherein the at least one physical computer storage medium includes instructions that, when executed by a processor, generate a warning on the portable device.

18. The storage medium of claim 15, wherein the at least one physical computer storage medium includes instructions that, when executed by a processor, estimate an uncertainty distance, including measuring a driving speed and the fault time.

19. The storage medium of claim 18, wherein the at least one physical computer storage medium includes instructions that, when executed by a processor, estimate an uncertainty distance including:
multiplying each elapsed fault time by a corresponding driving speed to yield at least one product; and
summing the at least one product to obtain the uncertainty distance.

20. The storage medium of claim 18, wherein the at least one physical computer storage medium includes instructions that, when executed by a processor, estimate the uncertainty distance until there is valid positioning system location information.

21. The storage medium of claim 15, wherein the at least one physical computer storage medium includes instructions that, when executed by a processor, record the malfunction includes storing malfunction data on the portable device.

22. The storage medium of claim 15, wherein the at least one physical computer storage medium includes a first storage device in the base unit and a second storage device in the portable device.

\* \* \* \* \*